Nov. 11, 1969 P. S. BEZANIS 3,477,693

CAM OPERATED FLUID VALVE

Filed Dec. 16, 1966

INVENTOR.
PERRY S. BEZANIS
BY
Roman A. Dimeo
ATTORNEY

United States Patent Office 3,477,693
Patented Nov. 11, 1969

3,477,693
CAM OPERATED FLUID VALVE
Perry S. Bezanis, 811 W. 29th,
San Pedro, Calif. 90731
Filed Dec. 16, 1966, Ser. No. 602,287
Int. Cl. F16k 31/52, 7/16, 15/14
U.S. Cl. 251—251                                 5 Claims

ABSTRACT OF THE DISCLOSURE

A fluid valve wherein the fluid flow therethrough is controlled by a cam-actuated plunger displacing a flexible diaphragm into closure contact with the valve inlet orifice.

---

This invention relates to fluid valves and more particularly to fluid valves utilizing diaphragms.

Heretofore, fluid valves used to control fluid flow have consisted primarily of cock valves (i.e., ball valves) or screw-type valves (i.e., household valves). Due to abrasive material which is commonly found suspended in the fluid of a system, erosion occurs to the critical surfaces of the aforesaid valve types with consequent leakage thereof. Further, the aforesaid valve types are also susceptible to friction wear of critical contact surfaces resulting in leakage of the valve. In the instant invention these disadvantages are overcome since the only portion of the valve which comes into contact with the system fluid is a flexible imperforate membrane or diaphragm which is not only free from wear, but will always automatically provide a positive closing function when the valve is in the "off" position. Further, the use of a flexible diaphragm avoids sudden closing of the inlet orifice by smoothly inhibiting water over a relatively large closing area thus eliminating detrimental "water-hammer" occurrences.

The structure of the valve of the instant invention controls simple "on and off" flow without friction and wear of parts and without need of packing or hydraulic pistons. In addition, the diaphragm displacement from the inlet orifice is limited thereby allowing the use of a cam as a torque-arm as opposed to a lever arm commonly used for this purpose. The "on and off" control is optimized by the use of a cam of low eccentricity (displacement) resulting in high lever advantage with low lateral reaction, i.e. minimal binding. In addition, valve operation can occur in either rotational direction without requiring continuous activation as in the usual lever arm valves.

The valve of the instant invention finds particular usefulness in conjunction with a bidet (a lavatory cleansing apparatus for bathing the posterior parts of the body). When used with a bidet, a valve of this type would have water from an extraneous supply source enter the inlet orifice thereof and exit through the outlet orifice into the bottom port of a heater. The cold water thus passing through the valve and into the heater would force the warm water in the heater from the top port thereof through a hose or tube so as to be expelled through the hose or tube nozzle. The above described flow, of course, would be terminated when the valve is closed.

Accordingly, the principal object of this invention is to provide a fluid valve of simple and inexpensive construction which is operated by a cam.

Another object is to provide a simple fluid valve which regulates fluid flow by use of a diaphragm.

Still another object is to provide a fluid valve which is free from friction wear.

Another object is to provide a fluid valve which has a high lever advantage and is free from binding.

Still another object is to provide a fluid valve which does not require continuous activation to operate the same.

Yet another object is to provide a fluid valve which is capable of bi-directional activation.

Another object is to provide a fluid valve which eliminates "water-hammer."

Still another object is to provide a fluid valve which functions without need of packing or hydraulic pistons.

Other objects and advantages of the invention will become apparent from the following description taken in conjunction with the accompanying drawings in which.

Figure 1:
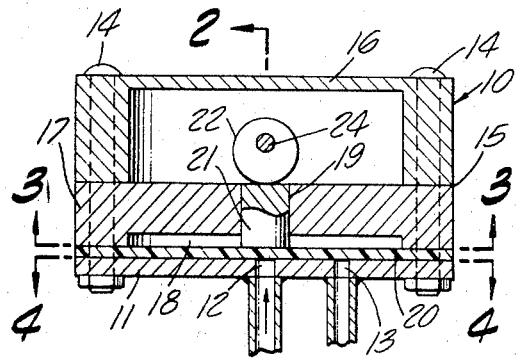
FIG. 1 is an elevational view, in section, of the valve of the instant invention showing the valve in a closed position.
Figure 2:
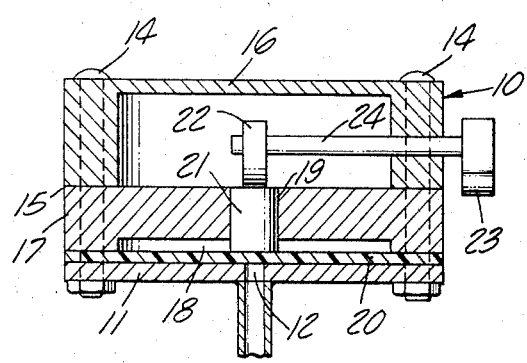
FIG. 2 is an elevational veiw, in section, of the valve of FIG. 1 taken on the line 2—2 thereof.
Figure 3:
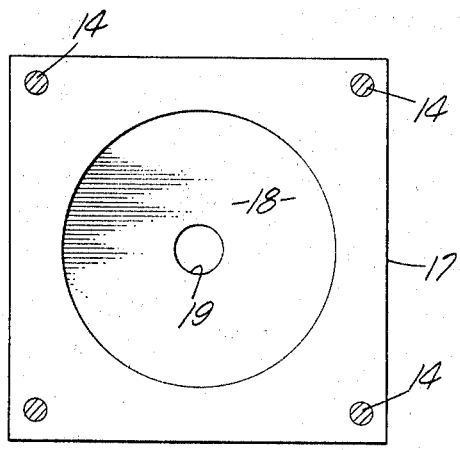
FIG. 3 is a bottom plan view of the valve of FIG. 1 taken on the line 3—3 thereof showing the diaphragm accommodating cavity.
Figure 4:
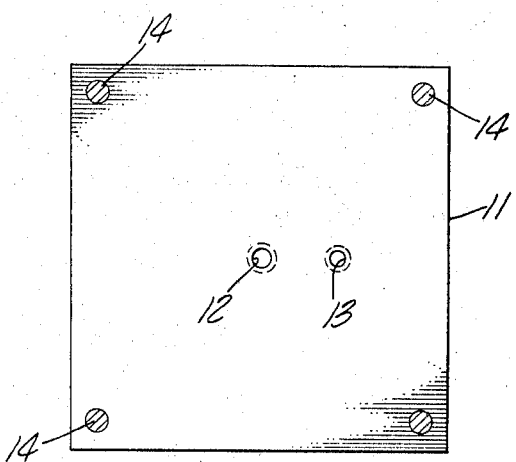
FIG. 4 is a top plan view of the valve of FIG. 1 taken on the line 4—4 thereof showing the relative position of the inlet and outlet orifices thereof.

Referring more particularly to FIGS. 1 through 5, reference numeral 10 designates generally the valve of the invention. Valve 10 is comprised of a lower body portion 11 having an inlet orifice 12 and an outlet orifice 13. Although one exit passageway or orifice is shown, it is understood that a plurality of exit orifices may be utilized without deviating from the scope of the invention. Secured to body portion 11 by bolts 14 is an upper body portion 15 comprised of a body cap 16 and an intermediate body portion 17 which is provided with a diaphragm receiving concavity 18 intersected by an axial bore 19. Positioned between intermediate body portion 17 of upper body portion 15 and lower body portion 11 is a diaphragm 20 having a composition of any suitable flexible material. A plunger 21 is slidably positioned within bore 19 of intermediate body portion 17 and normally maintains diaphragm 20 in tight association with inlet orifice 12 so as to prohibit the upward deflection of diaphragm 20 by the pressure of the fluid in the system. This obviously prohibits the fluid from exiting through the outlet orifice 13. Plunger 21 is maintained in its normally closed position (FIG. 1) by cam 22 which is secured to a handle 23, or the like, by shaft 24. It should be noted that cam 22 has a low eccentricity (i.e., its pivoted axis being only slightly displaced from the true axis thereof) thereby preventing activation of the valve due solely to the fluid pressure in the system. That is, fluid pressure will not cause diaphragm 20 and concomitantly plunger 21 to displace upwardly since cam 22, which is normally in engagement with plunger 21 when the valve is in the closed position, having a low eccentricity, requires more force to rotate the same than is provided by the fluid pressure alone. The cam 22 is enclosed, as shown, by body cap 16 of upper body portion 15.

Figure 5:
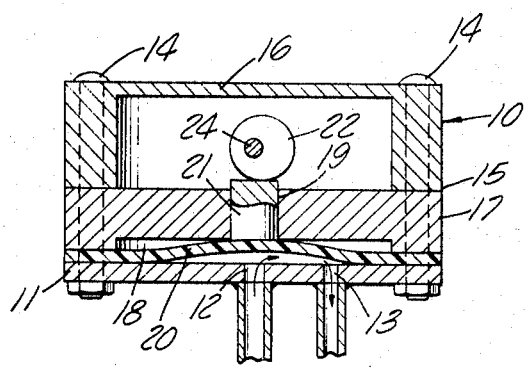
FIG. 5 is an elevational view, in section, of the valve of FIG. 1, but in an open position.

In FIG. 5 the valve is shown in an open position. In the open position, the cam 22 is rotated out of contact with the plunger 21. The fluid pressure in the line through inlet orifice 12 deflects diaphragm 20 upwardly into concavity 18 and simultaneously deflects plunger 21 upwardly into intermediate body portion 17, thereby allowing the fluid to exit through outlet orifice 13. When it is desired to shut off the fluid flow, cam 22 is rotated so as to again engage plunger 21 thereby displacing the plunger downwardly so as to position diaphragm 20 in tight association with inlet orifice 12.

Figure 6:
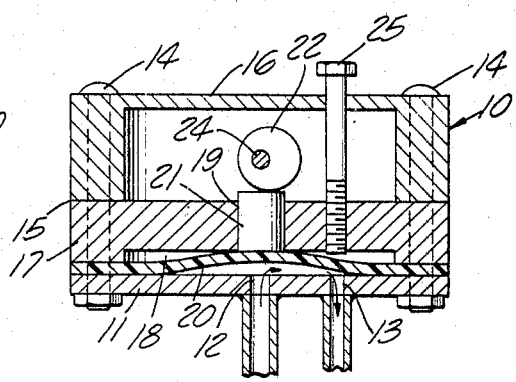
FIG. 6 is an elevational view, in section, of another embodiment of the valve of the instant invention showing a means for limiting the exit flow of the fluid, and a means for controlling "back-flow" of the fluid in the system.

FIG. 6 discloses an alternate embodiment of the valve of the invention wherein the valve illustrated in FIGS. 1 through 5 (particularly FIG. 5) is further provided with a means for regulating the fluid output of the valve comprised of an adjustment screw 25 passing through body cap 16 and which is in threaded engagement with intermediate body portion 17. By rotatably displacing adjustment screw 25 either upwardly or downwardly, the amount of flexing movement of diaphragm 20 over outlet orifice opening 13 is predetermined so that the exit flow of the system fluid is controlled at a specified rate.

While several embodiments of the invention have been described, it is understood that the particular embodiments of the invention herein discussed are for illustrative purposes only and that various changes may be made therein without departing from the principles of the invention.

I claim:
1. A fluid valve, comprising:
a body being divided into first and second body portions;
shallow cavity means and bore means carried by the first body portion;
inlet and outlet means carried by the second body portion;
a flexible imperforate diaphragm means positioned between said body portions;
plunger means slidably accomodated in said bore means so as to engage said diaphragm means;
cam means positioned adjacent said plunger means;
means secured to said cam means for rotating said cam means; and
adjustment means positioned opposite the orifice of the outlet means so as to engage and thereby limit the displacement of the diaphragm means.

2. A fluid valve comprising:
a body;
shallow cavity means and bore means carried by said body;
inlet and outlet means carried by said body;
a flexible imperforate diaphragm means positioned adjacent to said cavity means;
plunger means slidably mounted in said bore means;
cam means positioned adjacent to said plunger means;
means secured to said cam means for rotating said cam means; and
adjustment means positioned opposite the orifice of the outlet means so as to engage and thereby limit the displacement of said diaphragm means.

3. A fluid valve as described in claim 1, wherein said adjustment means is comprised of an adjustment screw threadably engaged with a threaded bore carried by the first body portion.

4. A fluid valve as described in claim 1 or claim 2, wherein the portion of the adjustment means which is adapted to engage said diaphragm means is of substantially greater diameter than the diameter of said orifice of the outlet means.

5. A fluid valve as described in claim 1 or claim 2, wherein said diaphragm means is normally in contact with the orifices of said inlet and said outlet means.

References Cited

UNITED STATES PATENTS

| | | | |
|---|---|---|---|
| 2,211,167 | 8/1940 | Safford | 251—331 X |
| 2,940,474 | 6/1960 | Webster | 251—331 X |

FOREIGN PATENTS

| | | |
|---|---|---|
| 854,650 | 1/1940 | France. |
| 1,121,474 | 4/1956 | France. |
| 154,001 | 9/1904 | Germany. |
| 811,416 | 8/1951 | Germany. |
| 853,469 | 11/1960 | Great Britain. |
| 489,794 | 1/1954 | Italy. |

MERVIN STEIN, Primary Examiner

WERNER H. SCHROEDER, Assistant Examiner

U.S. Cl. X.R.

251—285, 331